United States Patent Office 3,825,592
Patented July 23, 1974

---

3,825,592
PHENOLIC AMINOPOLYCARBOXYLIC CHELANTS
Avis L. McCrary and David A. Wilson, Lake Jackson, Tex., assignors to The Dow Chemical Company, Midland, Mich.
No Drawing. Filed Sept. 22, 1971, Ser. No. 182,894
Int. Cl. C07c *101/72*
U.S. Cl. 260—519                   3 Claims

ABSTRACT OF THE DISCLOSURE

New phenolic aminopolycarboxylic chelants of the formula

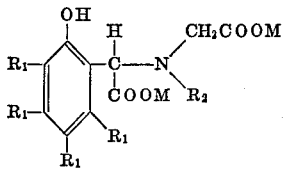

wherein M represents hydrogen or alkali metal ion, $R_1$ represents hydrogen, alkyl, $SO_3(M)$, or halogen, and $R_2$ represents hydrogen or ($-CH_2-COO(M)$), have been prepared which are useful in the correction of iron deficiencies in plants and in removal of iron scale.

BACKGROUND

This invention relates to novel chelating and sequestering agents which are useful over a wide pH range and particularly applicable for use in an alkaline or neutral environment.

Soil composition varies generally from one region to another and will vary specifically with location within a given region. The soil within a particular region may be characterized by its high alkalinity, lime content or phosphate content. In another region the soil may be characterized by its high acidity. The growing of plants requires that the soil have traces of a rather wide variety of metals. Further, some metals must be available in more than trace amounts. Iron is usually present in soils everywhere in substantial amounts, but is not usually present in a form which is available to the plant. For example, alkaline soils induce the formation of iron oxide and insoluble iron compounds which are not available to the plant. The resulting deficiency of iron results in a condition which is commonly identified as iron chlorosis.

The ferric chelate of ethylenediaminetetraacetic acid (EDTA) has been used for correcting iron deficiencies in plants grown in acidic soils. However, in alkaline soils, the material is ineffective due to hydrolysis of the chelate and subsequent inactivation of the iron as an insoluble iron hydroxide. The compounds of the present invention are capable of chelating iron over a wide pH range and thus may be used in either acidic or alkaline soils for correcting the trace metal deficiencies.

Some of the disadvantages of the use of the ferric chelate of ethylenediaminetetraacetic acid (EDTA) have been overcome by the use of phenolic compounds as disclosed in U.S. Pats. Nos. 2,824,128 and 2,921,847. However, their use is not as economic as is the use of the compounds of the present invention because of the higher molecular weight.

Another application of sequestering agents involves the use of scale removers. The majority of these, however, are used in an acidic solution and, therefore, exhibit an undesirable corrosive action toward the base metal and to the skin. The compositions of this invention have the ability to derust over a wide pH range and thus may be used in neutral to slightly alkaline systems where corrosion should be at a minimum.

STATEMENT OF THE INVENTION

The novel chelant compounds prepared in accordance with this invention have the formula

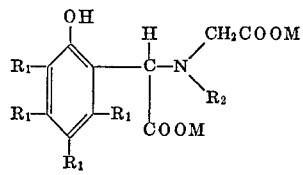

wherein M represents hydrogen or alkali metal ion, $R_1$ represents hydrogen, alkyl, $SO_3(M)$, or halogen, and $R_2$ represents hydrogen or ($-CH_2COO(M)$).

It is an object of this invention to provide novel compositions comprised of chelates and chelating agents such that trace metals (particularly iron) are made available to plants in the form of a chelate or as an ion thereof. The free chelating agent in the composition may also solubilize and render available trace metals contained in the soil.

It is another object of the invention to provide compositions useful for rendering available traces of metals in acid soils and alkaline soils such as those characterized as highly calcareous.

It is yet another object of this invention to provide novel compositions for use as scale removers in both acidic and alkaline solutions.

Because of the efficacy of these novel compositions to operate in neutral or slightly alkaline systems, they are advantageous as iron stain removers for household use, e.g., iron stain removal from fabrics and porcelain fixtures.

Other objects will be apparent from the following description.

GENERAL DESCRIPTION

The present inventors have discovered that these novel chelating agents can be prepared by condensing dichloroacetic acid, or the like, with amines containing at least one carboxymethyl group and a phenolic compound.

The novel compositions were prepared as shown in the following examples.

Example I

A mixture of 0.6 mole dichloroacetic acid and 25 ml. of water was neutralized with 100 ml. of 6.0 N sodium hydroxide with cooling. Phenol (0.5 mole), 0.5 mole of sodium glycinate, and 200 ml. of methanol were added to the reaction flask and the pH adjusted to 9.5. The reaction mixture was then heated for approximately 22 hours at 80–90° C. while maintaining the pH at 9.3–9.5 by the dropwise addition of 220 ml. of 6.0 N sodium hydroxide.

The reaction product was then adjusted with hydrochloric acid to a pH of less than 1 to assure formation of the amine hydrochloride of the chelant. The solution was then taken to dryness (*in vacuo*), extracted with anhydrous methanol, filtered, and the methanol removed by distillation. The material was submitted for infrared, N.M.R. and elemental analysis. Elemental, infrared and N.M.R. all supported the general structure of the compound

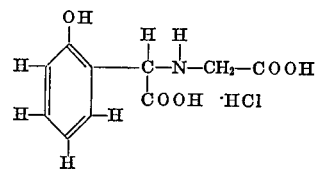

Example II

In a similar manner, phenol was condensed with disodium iminodiacetate and dichloroacetic acid to give predominantly the following compound

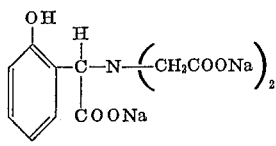

Example III

A mixture of 0.62 mole dichloroacetic acid and 20 ml. of water was neutralized with 85 ml. of 6.0 N sodium hydroxide with cooling. p-Chlorophenol (0.5 mole), 0.5 mole disodium iminodiacetate and 100 ml. of methanol were added to the reaction flask and the charge heated for 21 hours at 80–90° C. The pH was maintained at 9.3–9.5 during this time by the dropwise addition of 185 ml. of 6.0 N sodium hydroxide. The compound is found to be of the following structure

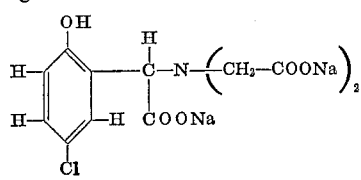

Example IV

The reaction of Example II was exactly repeated except that p-sec.-butylphenol was condensed with the disodium iminodiacetate and the dichloroacetic acid. Predictably, the structure of this compound is

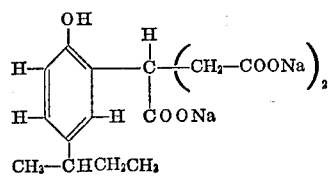

Example V

A mixture of 0.30 mole dichloroacetic acid and 25 ml. of water was neutralized with 50 ml. of 6.0 N sodium hydroxide with cooling. p-Phenolsulfonic acid (0.25 mole), disoduium iminodiacetate (0.25 mole) and 150 ml. of methanol were added to the reaction flask and the pH adjusted to 9.5 with 6.0 N sodium hydroxide. The reaction mixture was then heated for approximately 21 hours at 80–90° C. while maintaining the pH at 9.3–9.5 by the dropwise addition of 130 ml. of 6.0 N sodium hydroxide.

A determination of the iron chelation capacity as a function of pH was made by the following method. One millimole of the chelating agent was placed in a previously tared four-ounce bottle. To this was added 50 grams of distilled water and 1 millimole of 0.5 M ferric nitrate solution. Adjustment to the desired pH was made with dilute sodium hydroxide-hydrochloric acid. The sample weight was adjusted to 100 grams and allowed to stand for two weeks. A sample of the celar overhead solution was then removed and analyzed by emission spectroscopy for iron.

The chelation activity obtained for the composition of Example II was as follows Mmoles Fe+++/Mmole Agent at pH

| 7 | 9 | 10 | 11 | 12 | 13 |
|---|---|---|---|---|---|
| 1.0 | 1.0 | 1.0 | 0.98 | 0.93 | 0.60 |

Utilizing the novel composition of Example II, a very rusty coupon was placed in 100 ml. of 0.1 M solution of the ligand. The ligand had an adjusted pH of 8.3. The coupon was completely derusted within one to two hours.

A very rusty object was placed in 100 ml. of a 0.1 M solution of the novel composition of Example I. Samples were evaluated periodically for chelated iron and the results are shown in the graph below.

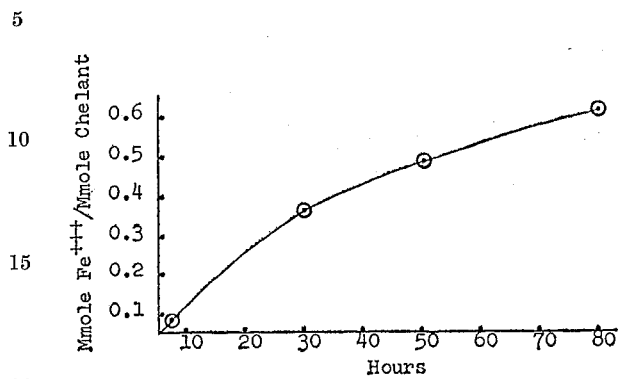

Other starting compounds having the necessary activity of the Cl groups of the dichloroacetic acid and a —COOM may be used in lieu of the acid. Sodium glyoxylate and glyoxalic acid are among these, with their C=O and —COOM groups.

The substituted phenols have already been indicated in the examples and in the general formula, while glycine or iminodiacetic acid may be used in place of the sodium salts.

The novel chelants of the present invention can be utilized effectively to combat iron chlorosis in plants by applying them directly in solution or as a comminuted solid to form soluble iron chelates with the iron present in the soil; alternatively, iron chelates of these chelants may be utilized. The various administration units may be applied in any of a wide variety of ways.

What is claimed is:

1. A phenolic aminopolycarboxylic chelant of the formula

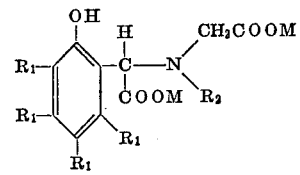

wherein M represents a member selected from the group consisting of hydrogen and an alkali metal, $R_1$ is selected from the group consisting of hydrogen, an alkyl, $SO_3(M)$, and a halogen, and $R_2$ is selected from hydrogen and —$CH_2$—COO(M).

2. The compound in accordance with the following formula

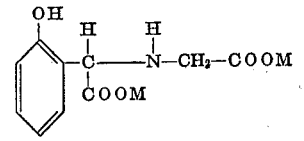

wherein M represents a member selected from the group consisting of hydrogen and an alkali metal.

3. The compound in accordance with the following formula

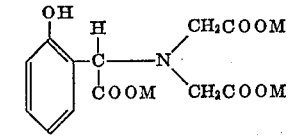

wherein M is selected from the group consisting of hydrogen and an alkali metal.

References Cited

UNITED STATES PATENTS

| | | | |
|---|---|---|---|
| 3,567,752 | 3/1971 | Israily | 260—519 |
| 3,679,729 | 7/1972 | Daniels | 260—519 |

FOREIGN PATENTS

| | | | |
|---|---|---|---|
| 718,509 | 11/1954 | Great Britain | 260—519 |
| 474,082 | 10/1937 | Great Britain | 260—519 |

OTHER REFERENCES

Harry Irving, et al., Journal of the Chemical Society (London) A, pp. 727–32, 1966.

LORRAINE A. WEINBERGER, Primary Examiner

P. J. HAGAN, Assistant Examiner

U.S. Cl. X.R.

71—1, 11; 260—439 R, 507 R